(12) United States Patent  (10) Patent No.: US 6,957,589 B2
Ueno et al.  (45) Date of Patent: Oct. 25, 2005

(54) TEMPERATURE COMPENSATOR OF TORQUE SENSOR

(75) Inventors: Takayuki Ueno, Tochigi (JP); Hiroyuki Akatsu, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/639,857

(22) Filed: Aug. 13, 2003

(65) Prior Publication Data

US 2004/0144183 A1   Jul. 29, 2004

(30) Foreign Application Priority Data

Jan. 27, 2003  (JP) ........................ 2003-017831

(51) Int. Cl.[7] .............. G01L 3/02; G01L 3/10
(52) U.S. Cl. .............. 73/862.331; 73/862.332
(58) Field of Search .............. 73/862.331, 862.332

(56) References Cited

U.S. PATENT DOCUMENTS 4,827,891 A  * 5/1989 Miura et al. ............ 123/598

6,622,576 B1  * 9/2003 Nakano et al. ........ 73/862.331

FOREIGN PATENT DOCUMENTS

JP   148128   5/2002

* cited by examiner

Primary Examiner—Max Noori
Assistant Examiner—Lilybett Martir
(74) Attorney, Agent, or Firm—Orum & Roth LLC.

(57) ABSTRACT

The present invention provides a temperature compensator for a torque sensor, including a pair of coils, which are connected to an AC power supply circuit via transistors and in which inductances change in opposite directions depending on torque, and a torque detecting means which obtains a voltage difference between a first voltage and a second voltage output via smoothing circuits based on changes in inductance of each pair of coils, and outputs as a torque detection voltage, the temperature compensator having a correcting voltage extracting means for extracting a voltage between terminals of a transistor in the AC power supply circuit as a temperature correcting voltage, and a correcting means for correcting the torque detection voltage based on a temperature correcting voltage Vs extracted by the correcting voltage extracting means.

7 Claims, 6 Drawing Sheets

TEMPERATURE COMPENSATOR OF TORQUE SENSOR

BACKGROUND OF THE INVENTION

1. Field of the Invention

The present invention relates to a temperature compensator of a torque sensor for detecting a torque on the basis of changes in inductance of a pair of coils connected to an AC power supply.

2. Description of the Related Art

In a torque sensor, its coil has temperature characteristics and changes in temperature due to thermal expansion of a housing and the like of a torque sensor component. For example, a coil holding portion affects the torque sensor detection output thereby distorting the accurate detection of torque.

There is an example in which the torque sensor is provided with a temperature sensor dedicated for temperature detection such as a thermister. See, for example, Japanese Patent Application Laid-Open No. 2002-148128 (patent document 1).

Patent document 1 is an example in which by inserting the thermister into one of a pair of resistors constituting a bridge circuit with a pair of coils, and at least changes in temperature of the bridge circuit are compensated.

Therefore, influences of temperature due to the structure of the torque sensor cannot be avoided.

Namely, distortions of the torque sensor components and housing due to thermal expansion affect the torque detection voltage.

SUMMARY OF THE INVENTION

The present invention has been achieved in view of the above-described problem. An object of the present invention is to provide a temperature compensator for a torque sensor capable of executing temperature compensation for the structure of a torque sensor, having a simple structure, at a low cost.

According to the present invention, there is disclosed a temperature compensator of a torque sensor including a pair of coils which are connected to an AC power supply circuit via transistors and in which inductances change in opposite directions depending on torque. A torque detecting means obtains a voltage difference between a first voltage and a second voltage output via smoothing circuits based on changes in inductance of each of the pair of coils and outputs as a torque detection voltage.

The temperature compensator comprises a correcting voltage extracting means for extracting a voltage between terminals of a transistor in the AC power supply circuit as a temperature correcting voltage, and a correcting means for correcting the torque detection voltage based on a temperature correcting voltage extracted by the correcting voltage extracting means.

BRIEF DESCRIPTION OF THE DRAWINGS

The present invention will be more fully understood from the detailed description given below and from the accompanying drawings which should not be taken to be a limitation of the invention, but are for explanation and understanding only.

DESCRIPTION OF THE PREFERRED EMBODIMENTS

One embodiment of the present invention is described below with reference to FIG. 1 to FIG. 6.

Figure 1:
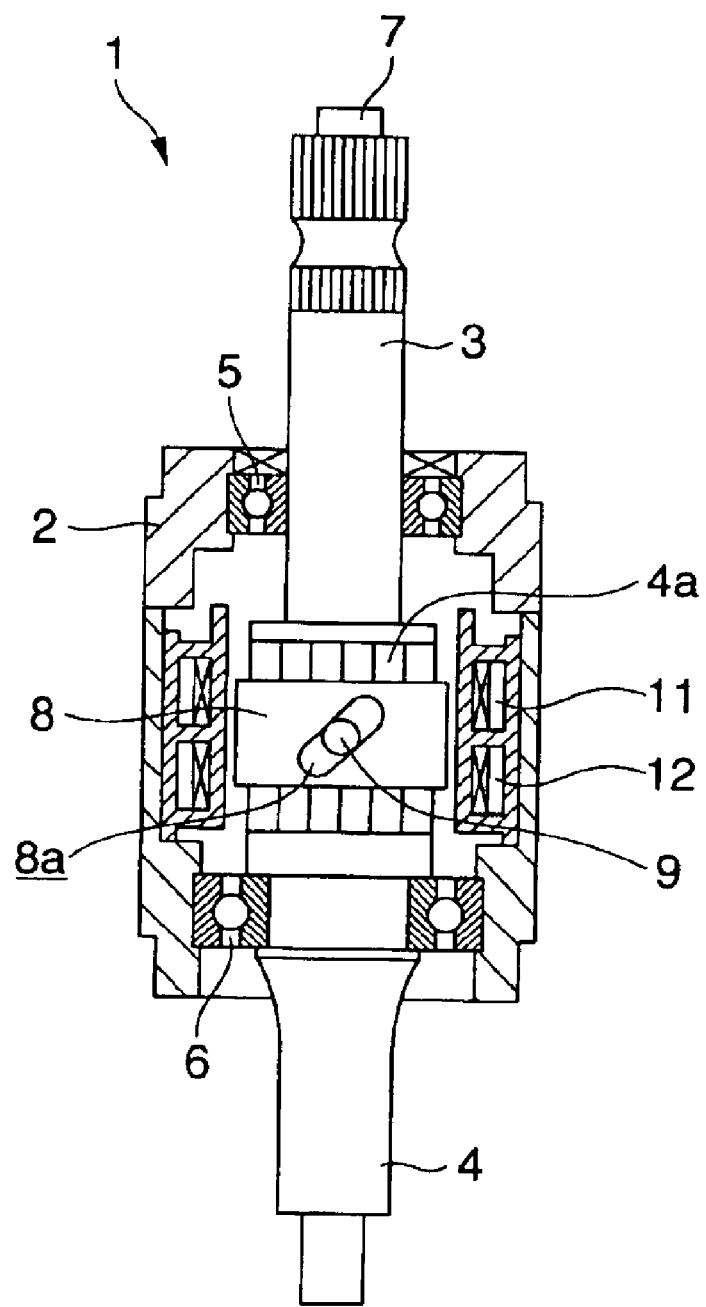
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, are coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidably along an axial direction via a space.

These two coils 11 and 12 are arranged at a side opposite each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed. As a result, a relative displacement in a rotating direction is generated between the input shaft 3 and the output shaft 4.

The relative displacement of the rotating direction slides the core 8 in the axial direction by an engagement of the slider pin 9 and the spiral groove 8a.

When the core 8 is moved to the axial direction, each area of the coils 11 and 12 surrounding the core 8 varies, and there is a relation between the coils when an area of one coil surrounding the core 8 increases, an area of the other coil surrounding the core 8 decreases.

When the area surrounding the core 8 increases, magnetic loss increases; therefore, inductance of the coil decreases. Conversely, when the area surrounding the core 8 decreases, magnetic loss decreases; therefore, inductance of the coil increases.

Accordingly, in the case where the torque of moving the core 8 to the coil 11 side acts, inductance L1 of the coil 11 decreases, and inductance L2 of the coil 12 increases. Conversely, in the case where the torque of moving the core 8 to the coil 12 side acts, inductance L1 of the coil 11 increases, and inductance L2 of the coil 12 decreases.

Figure 2:
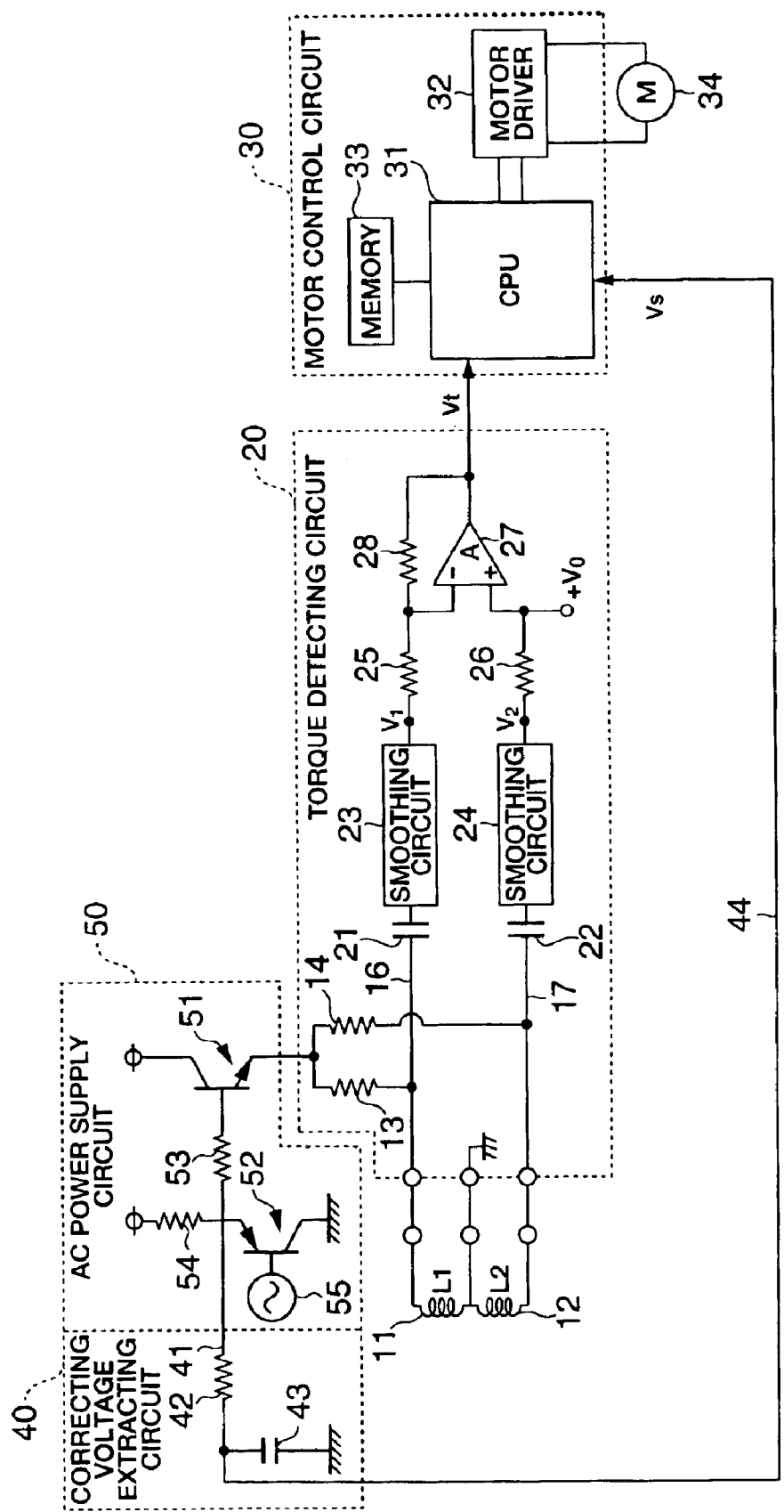
FIG. 2 is a schematic structure diagram of an electric circuit of the same torque sensor.

FIG. 2 shows a schematic structure diagram of an electric circuit for detecting a torque based on changes in inductance L1, L2 of coils 11, 12 in this torque sensor 1.

The coils 11, 12 are connected through each end, and signal lines from that connection terminal and the other ends are extended and connected to connecting terminals of a torque detecting circuit 20 disposed in an electric control unit ECU.

In the torque detecting circuit 20, connecting ends of the coils 11, 12 are grounded while the other ends are respectively connected to emitter terminals of an NPN type transistor 51 in the AC power supply circuit 50 through resistors 13, 14.

In the AC power supply circuit 50, the NPN type transistor 51 and the PNP type transistor 52 are connected to each other longitudinally.

That is, in the NPN type transistor 51, a constant voltage is applied to its collector terminal, and an emitter terminal of the PNP type transistor 52, the collector of which is grounded, is connected to a base terminal of the NPN type transistor 51 through a resistor 53.

A constant voltage is applied to an emitter terminal of the PNP type transistor 52 through a resistor 54 while AC voltage of an AC power supply 55 is input to a base terminal thereof.

The NPN type transistor 51 and the PNP type transistor 52 have opposite characteristics in terms of the temperature characteristic of the output voltage. The output voltage of the PNP type transistor 52 tends to descend with respect to a rise in temperature while the output voltage of the NPN type transistor 51 tends to rise.

Thus, because the NPN type transistor 51 and the PNP type transistor 52 are connected longitudinally, the temperature characteristic of a final stage output voltage becomes constant, so that the temperature compensation of the AC power supply circuit 50 is enabled.

A voltage signal line 16 extended from a connecting section between the resistor 13 and the coil 11, on which the output voltage of the AC power supply circuit 50 is applied, is connected to a smoothing circuit 23 through a capacitor 21. A voltage signal line 17 extended from a connecting section between the coil 12 and the resistor 14 is connected to a smoothing circuit 24 through a capacitor 22.

A bridge circuit is comprised of the coils 11, 12 and the resistors 13, 14, and an oscillation voltage is inputted to that bridge circuit. Output voltages from that circuit are inputted to the smoothing circuits 23, 24 and smoothed and outputted as first and second voltages $V_1$, $V_2$.

The first and second voltages $V_1$, $V_2$ are inputted to an inversion input terminal and a non-inversion input terminal of a differential amplifier 27, which is an operational amplifier, through the resistors 25, 26.

Negative feedback is applied to the differential amplifier 27 by the resistor 28 so that it functions as a differential amplifier. Its output is inputted to CPU 31 of a motor control circuit 30 as a torque detection voltage Vt.

Bias voltage $V_0$ is inputted to the non-inversion input terminal of the differential amplifier 27.

Therefore, the differential amplifier 27 amplifies a difference between the first voltage $V_1$ and the second voltage $V_2$ by A times, and outputs this plus the bias voltage $V_0$ as torque detection voltage Vt.

That is, the torque detection voltage Vt is $Vt=(V_2-V_1)A+V_0$.

A torque detection voltage Vt during a neutral time which is not deflected to either right steering torque (torsion torque in the right direction) or left steering torque (torsion torque in the left direction) is called neutral point voltage, and the aforementioned bias voltage $V_0$ at the normal time is the neutral point voltage.

This torque sensor 1 has the above-described schematic circuit structure. The operation will be described with reference to FIGS. 3A and 3B showing behaviors of the first and second voltages $V_1$, $V_2$ and the torque detection voltage Vt.

Figure 3A:
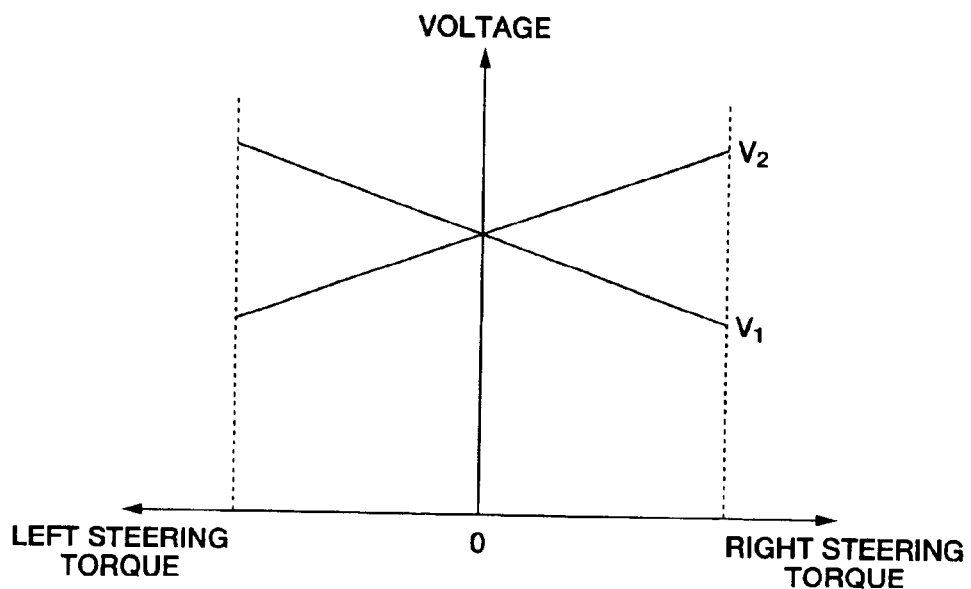
FIGS. 3A and 3B are diagrams showing first and second voltages and torque detecting voltages during normal operation.
Figure 3B:
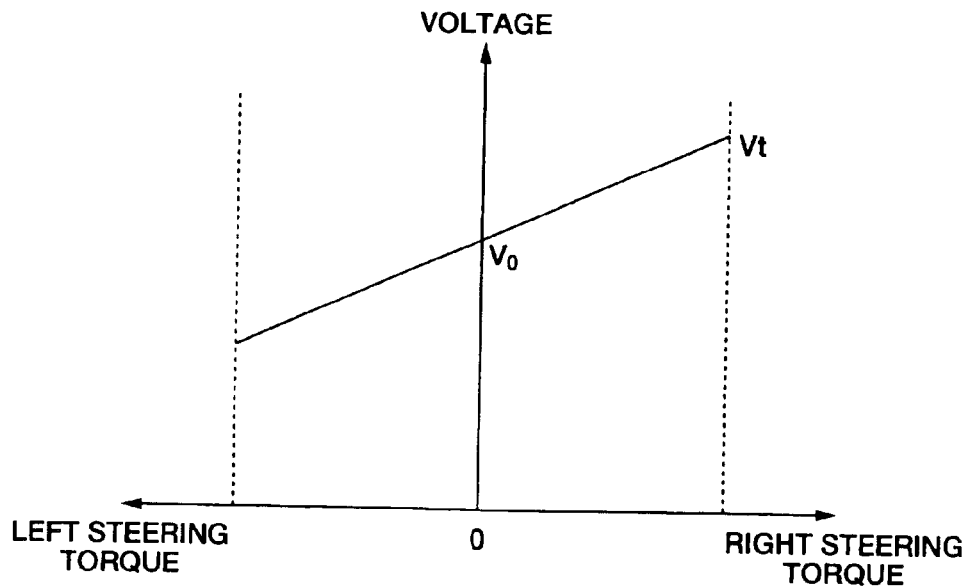

In coordinates shown in FIGS. 3A and 3B, its ordinate axis indicates voltage, rightward in the abscissa axis indicates right steering torque and leftward therein indicates left steering torque, while home position 0 indicates the neutral point.

FIGS. 3A and 3B indicate a condition in which the torque sensor 1 is operated normally. If the right steering torque is increased, a core 8 moves toward the coil 11 due to a relative rotation between the input shaft 3 and the output shaft 4. Consequently, the inductance L2 of the coil 12 is increased so as to increase induced electromotive force and conversely decreases the inductance L1 of the coil 11 so as to decrease induced electromotive force. As a result, the second voltage $V_2$ is increased while the first voltage $V_1$ is decreased (see FIG. 3A).

If the left steering torque is increased, conversely, the second voltage $V_2$ is decreased while the first voltage $V_1$ is increased (see FIG. 3A).

The torque detection voltage Vt, which is an output of the differential amplifier 27 gained by multiplying the difference between both by A times and then adding the bias voltage, is a rightward rising inclined line which passes the bias voltage $V_0$ at the neutral point shown in FIG. 3B.

The right and left steering torque can be detected according to the inclined line of the torque detection voltage Vt shown in FIG. 3B.

In the motor control circuit 30, the CPU 31 outputs a motor control instruction signal to a motor driver 32 based on the torque detection voltage Vt, so that a motor 34 which assists steering is driven by the motor driver 32.

In this manner, assistance of the motor 34 depending on the steering torque is obtained in the steering operation.

In the power steering control mechanism described above, influence upon the torque sensor 1 by temperature cannot be avoided.

Because the torque detection voltage Vt is obtained based on the difference between the first voltage $V_1$ and the second voltage $V_2$, changes in temperature of the respective coils 11, 12 are offset by each other so that they hardly affect the torque detection voltage Vt. However, distortions of structural components such as the core 8 of the torque sensor 1, a slider pin 9, and housing 2, due to thermal expansion, affect the first and second voltages $V_1$, $V_2$ individually, so that the torque detection voltage Vt is changed. Consequently, it is difficult to obtain an accurate torque reading.

Thus, this torque sensor 1 contains a correcting voltage extracting circuit 40, which extracts a temperature correcting voltage Vs to correct a torque detection voltage Vt based on a temperature correcting voltage Vs.

The correcting voltage extracting circuit 40 is a very simple circuit for extracting a temperature correcting voltage Vs, as shown in FIG. 2. An end of a resistor 42 is connected to a voltage signal line 41 extended from the emitter terminal of the PNP type transistor 52 of the AC power supply circuit 50 while a capacitor 43 whose end is grounded is connected to the other end thereof. An output line 44 is extended from a connecting point between the resistor 42 and the capacitor 43, and is connected to the CPU 31 of the motor control circuit 30, so as to output an extracted temperature correcting voltage Vs to the CPU 31.

Figure 4:
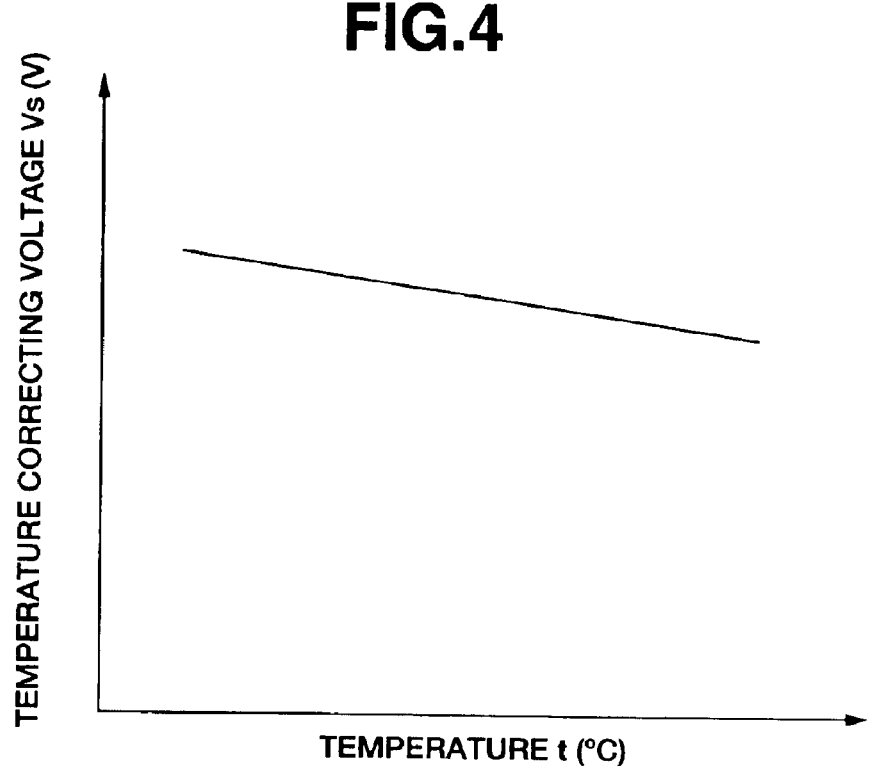
FIG. 4 is a diagram showing the temperature characteristics of a temperature correcting voltage.

The temperature correcting voltage Vs is similar to a collector/emitter voltage of the PNP type transistor 52. If a specific input voltage Vin is input to the base terminal, assuming that a base/emitter voltage is Vbe, the result is that Vs=Vbe+Vin. Because a constant input voltage Vin is added to the base/emitter voltage Vbe having the temperature characteristic, the temperature characteristic appears in the temperature correcting voltage Vs itself Because generally, the base/emitter voltage Vbe has a temperature coefficient of several mV/° C., the output temperature characteristic of the temperature correcting voltage Vs is indicated by FIG. 4.

That is, as the temperature t(° C.) rises, the temperature correcting voltage Vs(V) indicates a characteristic line descending rightward.

Figure 5:
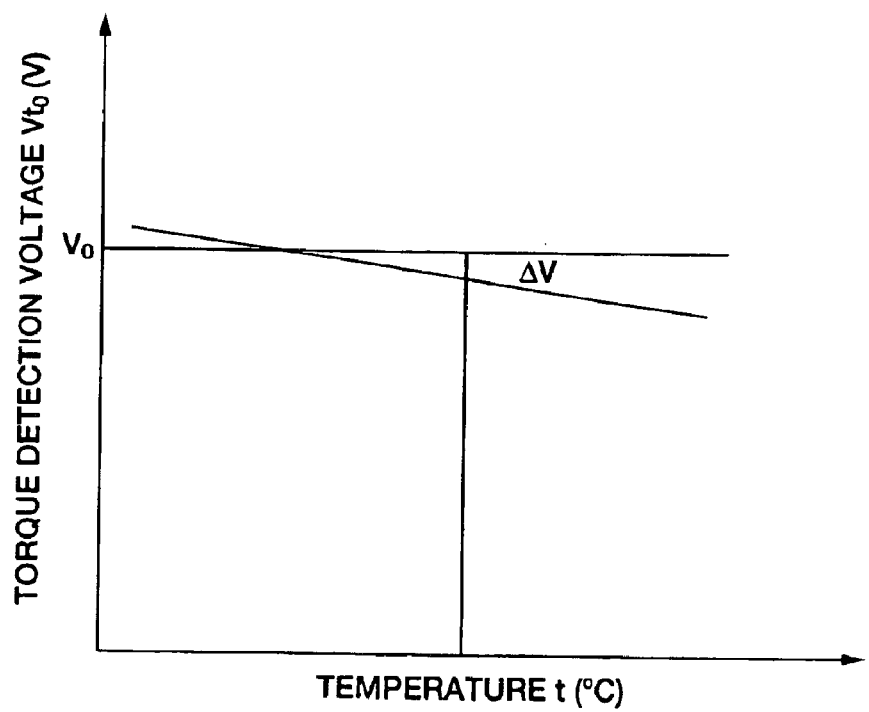
FIG. 5 is a diagram showing the temperature characteristics of the torque detecting voltage in a neutral state.

On the other hand, as for the torque detection voltage Vt, assume that the temperature characteristic of the torque detection voltage $Vt_0$ in a neutral condition of right/left steering is as shown in FIG. 5.

Although a normal voltage of the torque detection voltage Vt in the neutral condition is a constant value in terms of bias voltage $V_0$, a tilted temperature characteristic curve, substantially a straight line, results because deflection is generated due to an influence of temperature in a torque sensor component or the like.

Referring to FIG. 5, a voltage difference $\Delta V(=Vt_0-V_0)$ between torque detection voltage $Vt_0$ and the bias voltage $V_0$ at a specific temperature is a temperature correcting value at that temperature.

Thus, by detecting a temperature t from the temperature correcting voltage Vs based on the temperature characteristic shown in FIG. 4, from the detected temperature t, the temperature correcting value $\Delta V$ can be introduced from the temperature characteristic curve in FIG. 5. However, according to this embodiment, by changing the temperature, a relation in correspondence between the temperature correcting voltage Vs and the temperature correcting value $\Delta V$ is measured directly and stored in the memory 33.

Figure 6:
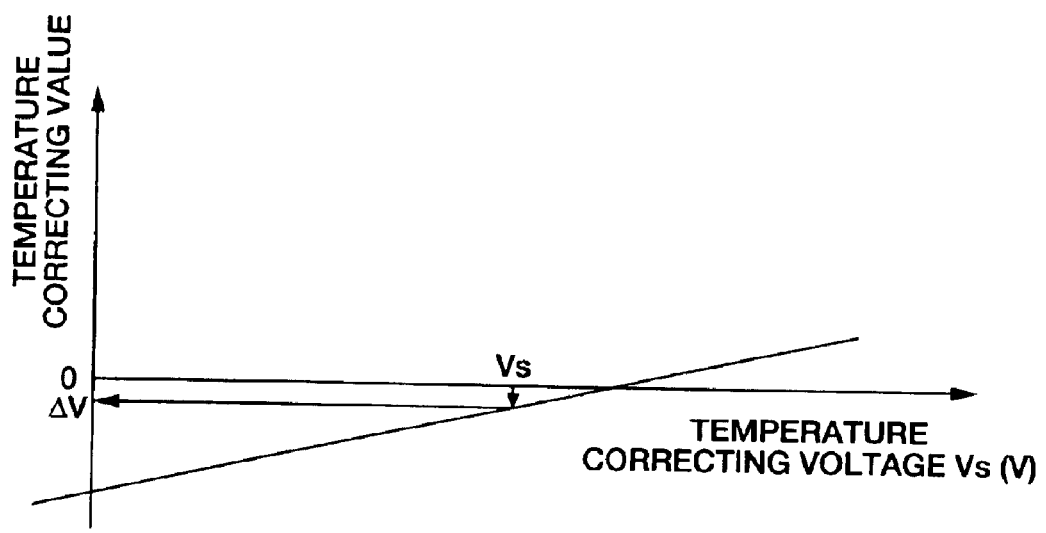
FIG. 6 is a diagram showing the relation in correspondence between the temperature correcting voltage $V_s$ and the temperature correcting value $\Delta V$ which is preliminarily measured and stored in a memory.
Figure 7:
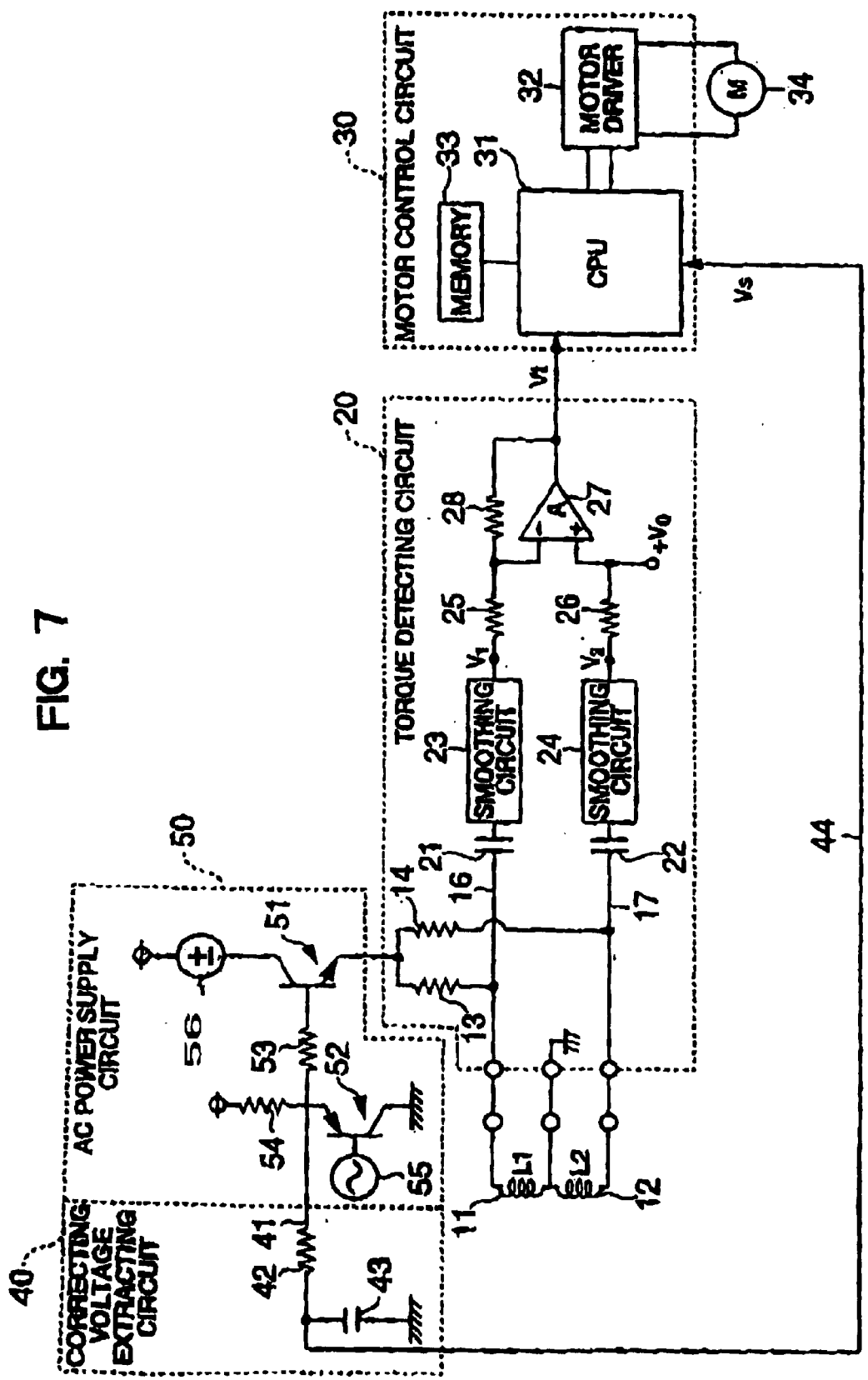
FIG. 7 is a schematic structure diagram of an electric circuit of and alternative torque sensor.

FIG. 6 shows the relation in correspondence between the temperature correcting voltage Vs and the temperature correcting value $\Delta V$ preliminary measured and stored in the memory 33.

By referring to this relation in correspondence, a corresponding temperature correcting value $\Delta V$ is extracted directly from the temperature correcting voltage Vs.

A torque detection voltage Vt actually detected by the torque detecting circuit 20 is added to this temperature correcting value $\Delta V$ to obtain the compensation of Vt+$\Delta V$.

An actual steering torque is detected from this correcting torque detection voltage Vt+$\Delta V$ with reference to FIG. 3B.

Thus, if the temperature correcting voltage Vs extracted from the correcting voltage extracting circuit 40 is inputted to the CPU 31, the CPU 31 extracts a corresponding temperature correcting value $\Delta V$ by referring to the relation in correspondence between the temperature correcting voltage Vs and the temperature correcting value $\Delta V$ stored in the memory 33. The torque detection voltage Vt inputted separately according to the same temperature correcting value $\Delta V$, is corrected, so as to detect an accurate steering torque, not affected by temperature changes dependent of other components than the coils and temperature changes in the AC power supply circuit 50, for driving the motor 34.

The torque sensor 1 and the temperature compensating unit of this embodiment are constructed as described above, and the correcting voltage extracting circuit 40 is a very simple circuit comprising the resistor 42 and the capacitor 43. This correcting voltage extracting circuit 40 can be disposed in an electronic control unit ECU and the like, and does not need to be provided on a torque sensor.

Because a temperature correcting voltage is extracted using an existing transistor 52 of the AC power supply circuit 50, no temperature sensor or temperature detecting circuit dedicated for the thermister is needed, thereby reducing the number of components significantly and simplifying its structure, finally leading to a reduction in cost.

If only the relation in correspondence between the temperature correcting voltage Vs and the temperature correcting value $\Delta V$ is recorded, it is not necessary to measure and record the temperature characteristic of the temperature correcting voltage Vs (FIG. 4) and the temperature characteristic of the torque detection voltage $Vt_0$ (FIG. 5). The control procedure is simplified, so that an error is not likely to occur.

The temperature correcting value $\Delta V$ can be computed by the CPU 31 directly by an arithmetic means from the temperature correcting voltage Vs detected by the temperature compensating circuit 40 on the basis of the relation in correspondence between the temperature correcting voltage Vs and the temperature correcting value $\Delta V$.

Although according to the above-described embodiment, the temperature correcting voltage Vs is inputted to the CPU 31, It is permissible to modify this temperature correcting voltage Vs or the temperature correcting value $\Delta V$ appropriately and input this value directly into a non-inversion input terminal of a differential amplifier 27 of the torque detecting circuit 20 as a bias voltage. In this way the torque detection voltage Vt remains in a constant relation with the steering torque regardless of the temperature (see FIG. 3B).

Although in the AC power supply circuit 50, the transistors 51, 52 are connected through two stages longitudinally, even an AC power supply circuit provided with the transistor as a single stage makes it possible to extract the temperature correcting voltage from that transistor and use it.

According to the present invention, there is disclosed a temperature compensator of a torque sensor including a pair of coils which are connected to an AC power supply circuit via transistors and in which inductances change in opposite directions depending on torque, and a torque detecting means which obtains a voltage difference between a first voltage and a second voltage output via smoothing circuits based on changes in inductance of each of the pair of coils and outputs as a torque detection voltage. The temperature compensator comprises a correcting voltage extracting means for extracting a voltage between terminals of a transistor in the AC power supply circuit as a temperature correcting voltage; and a correcting means for correcting the torque detection voltage based on a temperature correcting voltage extracted by the correcting voltage extracting means.

Because the base/emitter voltage of the transistor has a temperature characteristic, where the correcting voltage extracting means extracts a temperature correcting voltage from a transistor in the AC power supply circuit while the correcting means corrects the torque detection voltage based on the temperature correcting voltage, temperature compensation as a result of the structure of the torque sensor can be executed.

Because the temperature correcting voltage is extracted by using an existing transistor in the AC power supply circuit, no special temperature sensor or temperature detecting circuit is needed, thereby simplifying the structure, finally leading to reduction in cost.

Although each inductance of a pair of coils of the torque sensor has temperature characteristics, because a voltage difference between a first voltage and a second voltage depending upon induced electromotive force of each coil is adopted as a torque detection voltage, temperature changes of the respective coils are substantially balanced out, not affecting the torque detection voltage.

According to the present invention, there is disclosed a temperature compensator for a torque sensor. The AC power supply circuit may be so constructed that an emitter terminal of a PNP type transistor is connected together with a DC power supply 56 to a base terminal of an NPN type transistor, an emitter terminal of which is connected to the pair of coils and a collector terminal of which is connected to the DC power supply 56 while an AC power supply is connected to a base terminal of the PNP type transistor. The correcting voltage extracting means extracts a collect/emitter voltage of the PNP type transistor as a temperature correcting voltage.

Then, the voltage temperature characteristic by an AC power supply comprised of only the NPN type transistor is modified by combining it with the PNP type transistor longitudinally, so as to secure a stable AC power supply which is not affected by an influence of the temperature and which can supply stable voltage. Consequently, by correcting the torque detection voltage accurately, a high precision torque can be detected.

The temperature characteristic of the base/emitter voltage of the transistor appears also in the collector/emitter voltage.

As heretofore explained, embodiments of the present invention have been described in detail with reference to the drawings. However, the specific configurations of the present invention are not limited to the embodiments but those having a modification of the design within the range of the present invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A temperature compensator of torque sensor including a pair of coils which are connected to an AC power supply circuit via transistors and in which inductances change in opposite directions depending on torgue, and a torque detecting means arranged and constructed to obtain a voltage difference between a first voltage and a second voltage output via smoothing circuits based on changes in inductance of each of the pair of coils and outputs as a torque detection voltage, the temperature compensator comprising:

a correcting voltage extracting means for extracting a voltage between terminals of a transistor in the AC power supply circuit as a temperature correcting voltage; and a correcting means for correcting the torque detection voltage based on a temperature correcting voltage extracted by the correcting voltage extracting means, wherein the AC power supply circuit is constructed such that an emitter terminal of a PNP type transistor is connected together with a DC power supply to a base terminal of an NPN type transistor, an emitter terminal of which is connected to the pair of coils and a collector terminal of which is connected to the DC power supply while an AC power supply is connected to a base terminal of the PNP type transistor, and the correcting voltage extracting means is arranged and constructed to extract a collector/emitter voltage of the PNP type transistor as a temperature correcting voltage.

2. The temperature compensator of torque sensor according to claim 1, wherein the correcting voltage extracting means is constructed such that an end of a resistor is connected to a voltage signal line extended from an emitter terminal of a PNP type transistor of the AC power supply circuit, while a capacitor, one end of which is grounded, is connected to the other end of the resistor.

3. The temperature compensator of torque sensor according to claim 2, wherein the correcting means records the relation in correspondence between the temperature correcting voltage and the temperature correcting value preliminarily in a memory, and when a temperature correcting voltage extracted from the correcting voltage extracting means is input into the correcting means, a temperature correcting value is computed based on the temperature correcting voltage input according to the relation in correspondence between the temperature correcting voltage and the temperature correcting value preliminarily recorded, wherein the torque detection voltage input by the correcting means separately is compensated according to the temperature correcting value.

4. The temperature compensator of torque sensor according to claim 1, wherein the correcting means records the relation in correspondence between the temperature correcting voltage and the temperature correcting value preliminarily in a memory, and when a temperature correcting voltage extracted from the correcting voltage extracting means is input into the correcting means, a temperature correcting value is computed based on the temperature correcting voltage input according to the relation in correspondence between the temperature correcting voltage and the temperature correcting value preliminarily recorded, wherein the torque detection voltage input by the correcting means separately is compensated according to the temperature correcting value.

5. A temperature compensator of torque sensor including a pair of coils which are connected to an AC power supply circuit via transistors and in which inductances change in opposite directions depending on torque, and a torque detecting means arranged and constructed to obtain a voltage difference between a first voltage and a second voltage output via smoothing circuits based on changes in inductance of each of the pair of coils and outputs as a torque detection voltage, the temperature compensator comprising:

a correcting voltage extracting means for extracting a voltage between terminals of a transistor in the AC power supply circuit as a temperature correcting voltage; and a correcting means for correcting the torque detection voltage based on a temperature correcting voltage extracted by the correcting voltage extracting means, wherein an oscillating voltage is inputtable into a bridge circuit comprised of the pair of coils and resistors and an output voltage therefrom is smoothable by the smoothing circuit so as to produce the first voltage and the second voltage.

6. The temperature compensator of torque sensor according to claim 5, wherein the correcting means records the relation in correspondence between the temperature correcting voltage and the temperature correcting value preliminarily in a memory, and when a temperature correcting voltage extracted from the correcting voltage extracting means is input into the correcting means, a temperature correcting value is computed based on the temperature correcting voltage input according to the relation in correspondence between the temperature correcting voltage and the temperature correcting value preliminarily recorded, —wherein the torque detection voltage input by the correcting means separately is compensated according to the temperature correcting value.

7. A temperature compensator of torque sensor including a pair of coils which are connected to an AC power supply circuit via transistors and in which inductances change in opposite directions depending on torque, and a torque detecting means arranged and constructed to obtain a voltage difference between a first voltage and a second voltage output via smoothing circuits based on changes in inductance of each of the pair of coils and outputs as a torque detection voltage, the temperature compensator comprising:

a correcting voltage extracting means for extracting a voltage between terminals of a transistor in the AC power supply circuit as a temperature correcting voltage; and a correcting means for correcting the torque detection voltage based on a temperature correcting voltage extracted by the correcting voltage extracting means, wherein the correcting means records the relation in correspondence between the temperature correcting voltage and the temperature correcting value preliminarily in a memory, and when a temperature correcting voltage extracted from the correcting voltage extracting means is input into the correcting means, a temperature correcting value is computed based on the temperature correcting voltage input according to the relation in correspondence between the temperature correcting voltage and the temperature correcting value preliminarily recorded, wherein the torque detection voltage input by the correcting means separately is compensated according to the temperature correcting value.

* * * * *